United States Patent
Chappell et al.

[11] Patent Number: 6,045,201
[45] Date of Patent: Apr. 4, 2000

[54] BOLT-ON CUTTING APPARATUS

[75] Inventors: Charles J. Chappell, Joliet; William H. Godfrey, Yorkville; John E. Puchosic, Jr., Naperville, all of Ill.

[73] Assignee: Caterpillar Inc., Peoria, Ill.

[21] Appl. No.: 09/034,704

[22] Filed: Mar. 4, 1998

Related U.S. Application Data

[60] Provisional application No. 60/043,402, Apr. 4, 1997.

[51] Int. Cl.[7] .................................................. B62D 55/088
[52] U.S. Cl. ........................................... 305/110; 305/107
[58] Field of Search .................................... 305/100, 107, 305/110, 115

[56] References Cited

U.S. PATENT DOCUMENTS

| | | | |
|---|---|---|---|
| 4,830,439 | 5/1989 | Collins et al. | 305/110 |
| 5,330,260 | 7/1994 | Freeman | 305/107 |
| 5,451,100 | 9/1995 | Freeman | 305/107 |
| 5,553,932 | 9/1996 | Freeman | 305/107 |
| 5,820,230 | 10/1998 | Freeman | 305/107 |

*Primary Examiner*—Russell D. Stormer
*Attorney, Agent, or Firm*—William C. Perry; Dave M. Masterson; Byron G. Buck, III

[57] ABSTRACT

In the operation of machines such as landfill compactors it is common to provide a shear assembly that is mounted between the axle assembly and a wheel that is rotatably mounted thereon to sever material that would otherwise become entrained about the axle assembly. Material of relatively large gauge may become lodged within the shear assembly and create large loading forces between the wheel and the axle components that have been known to damage various drive train components. The present invention provides a cutting apparatus that has a first (34) and second shear blade (40) mounted to the axle assembly (10) and wheel (12) respectively. The second shear blade (40) is bolted (66,68,70) to the wheel (12) in a manner wherein selected ones of the mounting bolts (66,68,70) are sized in a manner in which forces of a preselected magnitude will shear the bolts (68,70) thus limiting the amount of force transmitted to the drive train components.

9 Claims, 2 Drawing Sheets

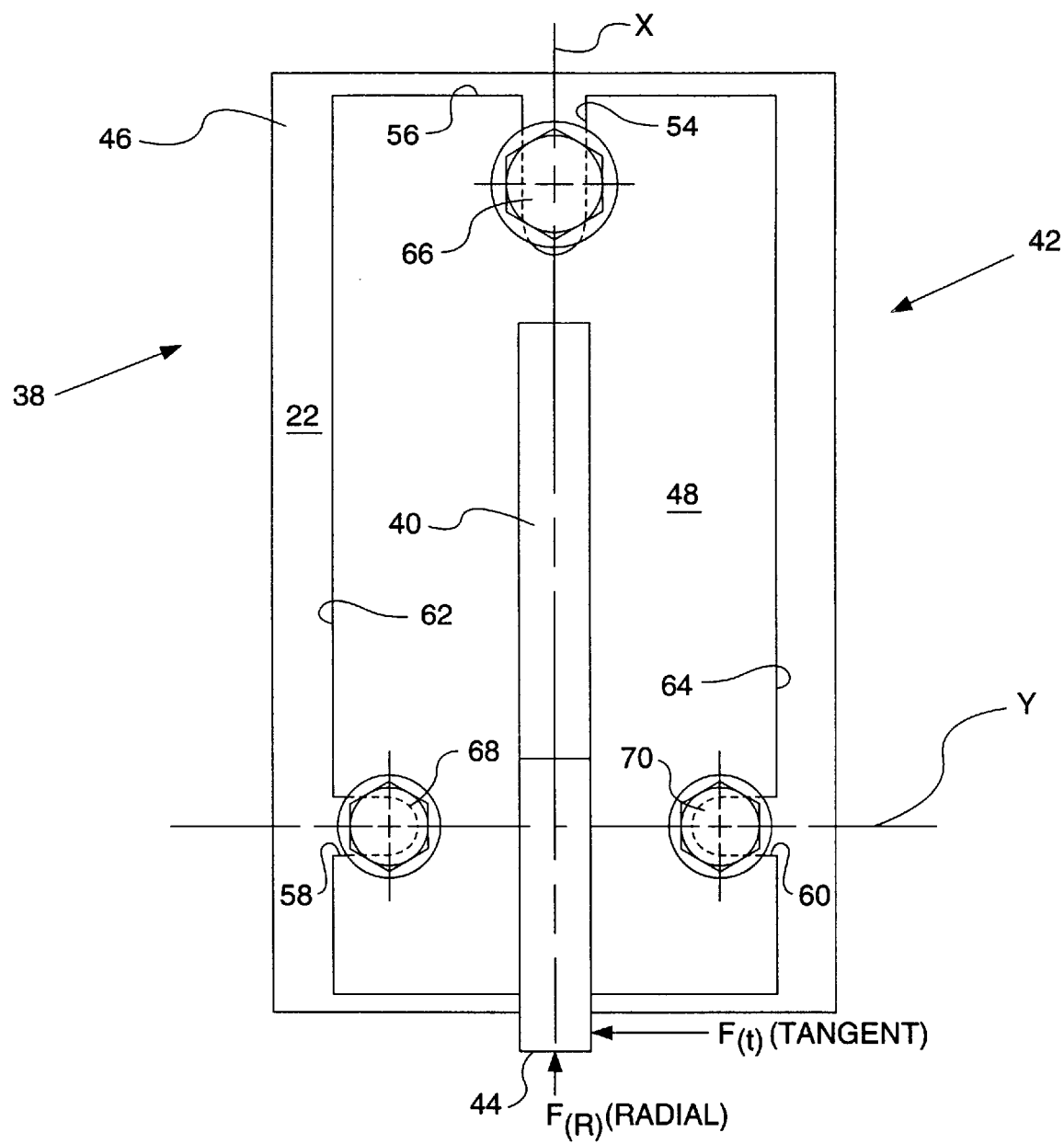

BOLT-ON CUTTING APPARATUS

CROSS REFERENCE TO RELATED APPLICATIONS

This application is based, in part, on the material disclosed in U.S. provisional patent application Ser. No. 60/043,402 filed Apr. 4, 1997.

TECHNICAL FIELD

This invention relates to a cutting apparatus for a construction machine and more particularly to a cutting apparatus that is bolted in place in a manner wherein failure of the cutting apparatus will occur upon the application of a preselected force.

BACKGROUND ART

In the operation of construction machines of the type known as landfill compactors, it is a common and recurring problem to have refuse packed in and around the wheels of the machine. Landfills are typically filled with many kinds of refuse, but in many sites there is an abundance of wire, metal banding and strands of other types of metal. When the machine traverses the terrain, these strips of material tend to become picked up by the teeth of the compacting wheel and entrained thereabout. The material will carry other refuse with it and the entire inner portion between the wheel and the machine can become packed with debris. This not only inhibits the oscillation of the axles and thereby adversely affecting machine performance, but it also causes the inner portions of the wheels to become prematurely worn out due to continual contact with the debris packed in and around areas adjacent the wheel. In addition, the machine must be continually removed from the site to a service area to cut the material away, and to clean the debris from around the axle. This is costly in terms of both manpower and lost production time.

One solution to this problem has been to provide a cutting mechanism between the wheel and the axle to act as a shear as the machine moves and the wheels turn. In one particular design, disclosed in U.S. Pat. No. 5,330,260, a stationary shear member is mounted to the axle housing while a second shear member is mounted to the inner portion of an adjacent wheel. The two shear members are arranged so that they pass in close proximity to one another as the wheel rotates about the axle. The material that would be entrained about the axle is severed as the two shear members pass one another.

While this system has been known to work well as a shear mechanism, the force created between the wheel and the axle has been known to be excessive. Because the two shear members are welded in place, there is virtually no "give" between the shear members and the forces created by the shearing of material are transferred directly into the axle assemblies. This excessive force could overload the axle assemblies and cause premature failure of any one of a number of components within the axle assemblies.

BRIEF DESCRIPTION OF THE DRAWINGS

FIG. 2 is a fragmentary, diagrammatic section view taken along lines 2—2 of FIG. 1.

BEST MODE FOR CARRYING OUT THE INVENTION

Figure 1:
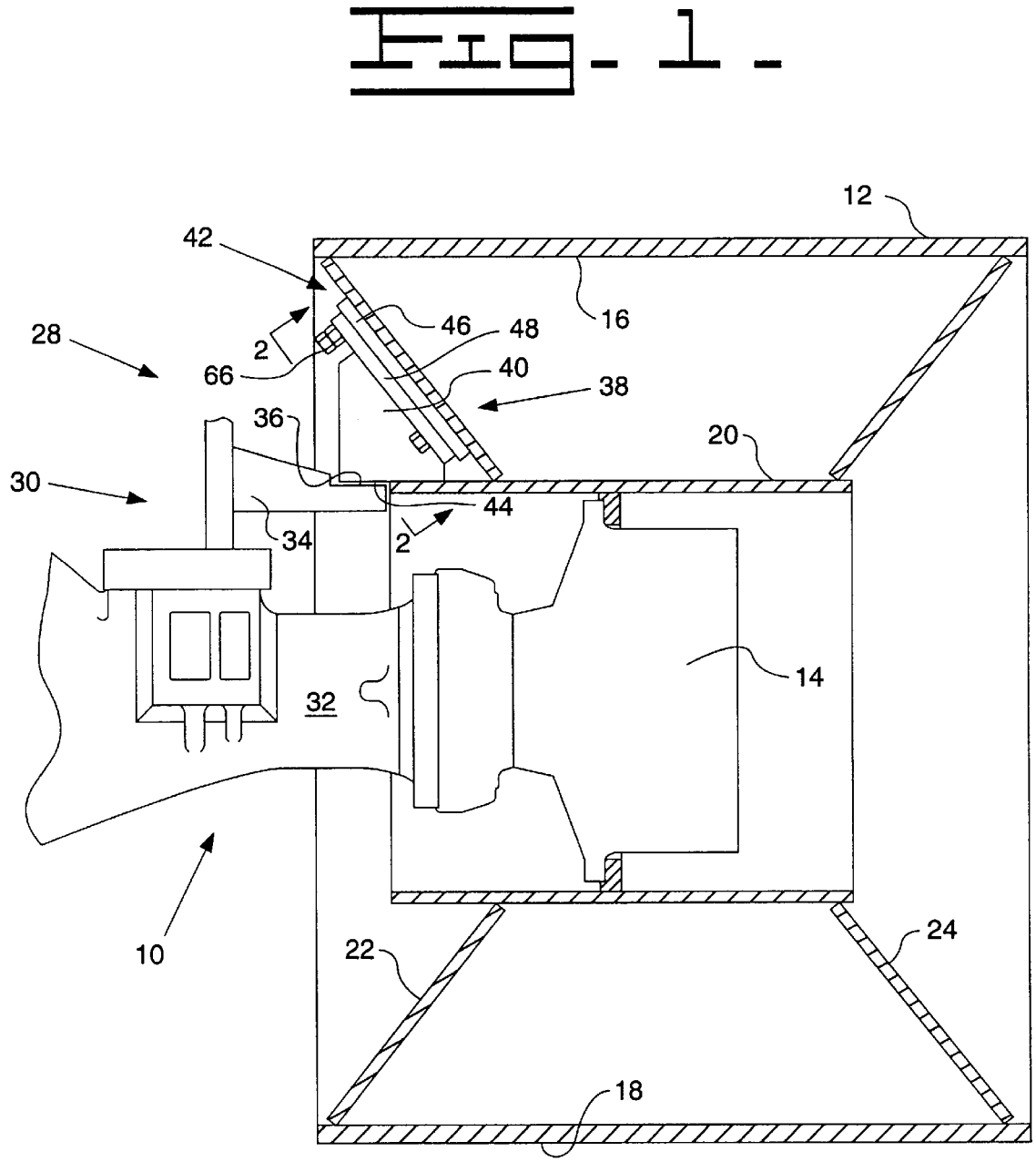
FIG. 1 is a fragmentary, diagrammatic side view of and axle and wheel assembly for a construction machine that embodies the principles of the present invention.

Turning to the drawings, an axle assembly is shown generally at 10. The axle assembly extends from a machine (not shown) of the type known as a landfill compactor, for example. The axle assembly 10 mounts a compacting wheel 12 on a first, or distal end portion 14 of the axle assembly in a well known manner. The compactor wheel is comprised of a drum member 16 that supports a plurality of compacting teeth (not shown) on an outer periphery 18 thereof that serve to compact and/or break up refuse as the machine traverses the terrain. The compacting wheel further defines an inner hub 20 that is secured to the axle assembly 10 in a well known manner, such as a bolted connection, for example. An inner and outer wall 22 and 24 extend between the hub 20 and the drum member 16 and are secured to both members by welding to provide support between the drum member and the hub. Each of the inner and outer walls 22 and 24 are conically shaped and define a tapered surface that extends inwardly from the drum member to the hub.

A shear assembly, shown generally at 28, is provided between the axle assembly 10 and the wheel 12. The shear assembly includes a first shear member 30 that is mounted to a housing 32 defined by the axle assembly 10. The first shear member 30 defines a first shear blade 34 that has a cutting edge 36 that extends in a substantially parallel to the axle assembly, at a location that is adjacent the hub 20. A second shear member 38 defines a second shear blade 40 and is mounted by a bracket assembly 42 to the tapered inner wall 22 of the wheel assembly 10. The second shear blade 40 defines a cutting edge 44 that extends substantially parallel to the axle assembly and is mounted to rotate in close proximity to the cutting edge 36 defined by the first shear blade 34.

Referring now to FIG. 2, it can be seen that the bracket assembly 42 includes a base plate 46 that is secured by welding or similar method to the tapered inner wall 22 defined by the wheel 12. The second shear blade 40 is secured by welding or similar manner, to an intermediate mounting plate 48 that extends in plane that is perpendicular to that of the second shear blade. The intermediate plate 48 defines a first slot 54 that extends along a centerline X that is substantially parallel to and aligned with a plane defined by the second shear blade 40 as viewed in FIG. 2. The first slot opens onto a first or upper surface 56 defined by the intermediate mounting plate. A pair of second slots 58 and 60 are defined in the intermediate mounting plate and are aligned along a common centerline Y that is perpendicular to the centerline X that extends through the first slot 54. The slots 58 and 60 open onto second and third surfaces 62 and 64 which are shown to be opposing side surfaces defined by the intermediate mounting plate 48.

A first mounting bolt 66 is positioned in the first slot 54 and has a preselected size. The first mounting bolt is preferably a standard bolt having an Industrial standard strength classification known as Metric 10.9 with a standard shank/thread diameter commonly known as M30. A pair of second mounting bolts 68 and 70 are positioned in the second slots 58 and 60, respectively, and have a preselected size less than that of the first bolt 66. The second mounting bolts are also preferably a standard bolt having an Industrial standard strength classification known as Metric 10.9, however the standard shank/thread diameter is commonly known as M20. Being sized as they are, the second pair of bolts has a slightly smaller in diameter than that of the first bolt.

Industrial Applicability

In operation, the wheel 12 of the compacting machine, rotates about the axis of the axle assembly 10. As the second shear blade 40 rotates with the wheel, it passes in very close proximity to the first shear blade 34. Should any material, such as wire or steel banding material become entrained about the axle assembly, it will typically become draped across the cutting edge of the first blade member. As the second blade member rotates past the first blade member, the strands of wire or other material are severed by the shearing action of the passing blade members. In the event, however, that a piece of large material becomes positioned between the two blade members, the mounting of the second blade member is design to fail at a preselected force, to prevent excessive loads from being applied to the axle components.

The failure of the second blade member 40 is designed to occur at the bolted mounting between the intermediate plate 48 and the base plate 46. The forces that occur between the two blade members 34 and 40, occur basically along two lines of action, radial and tangential. Either load, if greater than a predetermined amount, will cause one or both of the bolts 68 or 70 to shear off, immediately reducing the amount of force transmitted to the axle assembly 10.

An illustration of the force reaction can best be shown and described with reference to FIG. 2. If for example, a load exceeding the predetermined tangential force would be applied to the second blade member 40 at F(t), the force would cause the bolt 68 to shear in two. This will occur because bolt 70 on the opposite side, is positioned in the slot 60 and no force will be brought to bear against the right side of the shank of bolt 70 since the force F(t) is tending to urge the intermediate plate toward the left as viewed in FIG. 2. The bolt 66 is substantially centered in slot 54 and only the sides of the slot bear against he shank of bolt 66. This allows the bolt 66 to take very little load while creating a pivot point for the movement of the intermediate mounting plate 48. The reverse will happen if the tangential force f(t) is applied to the opposite side of the second shear blade 40.

If a force exceeding the preselected force F(R) is applied to the second shear blade 40 along the lines shown in FIG. 2, the sides of the second slots 58 and 60 will be brought to bear against the lower portions of the shanks of second mounting bolts 68 and 70 respectively as viewed in FIG. 2. Since the first mounting bolt 66 is positioned in the center of the first slot 54, the intermediate mounting plate 48 will be allowed to move upwardly as viewed in FIG. 2, allowing the second mounting bolts 68 and 70 to be severed. In order for the bolts 68 and 70 to be positioned to accommodate the majority of the loads applied between the first and second shear members, it is necessary that they be located on the lower half of the intermediate mounting plate 48 and preferably in the lower one third thereof as close to the line of force as possible.

With a mounting system as is shown and described above, a cutting system for a construction machine, such as a landfill compactor, is provided that will effectively reduce the amount of material entrained and packed around the axle and wheel assemblies of the machine while limiting the amount of forces transmitted into the components of the axle assembly. The cutting system is design to be bolted in place and is therefore easily and inexpensively replaced upon failure of the bolted connection while alleviating the transmission of potentially excessive loads into the components of the axle assembly.

Other aspects, objects and advantages of this invention can be obtained from a study of the drawings, the disclosure and the appended claims.

We claim:

1. A cutting apparatus adapted for use between and axle assembly and a wheel that is mounted on the axle for rotation with respect thereto, comprising:

a first shear member having a cutting edge positioned at an orientation that is substantially parallel to the axle assembly and being fixedly attached to the axle member;

a second shear member having a cutting edge positioned at an orientation that is substantially parallel to the axle assembly and being mounted to an inner surface of the wheel, said shear members being positionable in a manner wherein the respective cutting edges are in closely spaced opposition with respect to one another during rotation of said wheel, wherein the second shear member includes a mounting plate having a first slot defined thereon to open onto a first surface thereof, a second slot defined thereon to open onto a second surface thereof and a third slot defined thereon to open onto a third surface thereof, wherein the first slot terminates in an end portion that is spaced from the first surface of the mounting plate and is positioned along a first centerline that extends alone a plane defined by the second shear member, wherein the second and third slots are positioned along a second centerline that is substantially perpendicular to the first centerline, said second and third slots terminating at respective end portions that are spaced from the respective second and third surfaces of the mounting plate;

a first mounting bolt being positioned within the first slot at a location that spaced between the terminal end portion of the slot and the first surface and having a first preselected diameter; and second and third mounting bolts being positioned within the respective second and third slots and having a diameter that is slightly smaller than that of the first mounting bolt, wherein the second and third mounting bolts are positioned within the respective slots with a portion thereof in contact with the respective terminal end portions of the respective second and third slots, said second mounting bolt being adapted to shear upon application of a force to the cutting edge that is greater than a preselected magnitude along a line substantially parallel to the second centerline and in a direction that extends from the third side of mounting plate toward the second side thereof, and said third mounting bolt being adapted to shear upon application of a force to the cutting edge that is greater than a preselected magnitude along a line substantially parallel to the second centerline in a direction that extends from the second side of the mounting plate toward the third side thereof.

2. In a cutting apparatus adapted for use between an axle assembly and a wheel that rotates about the axle assembly, including a first shear blade and having a cutting edge defined thereon and being mounted on the axle assembly and a second shear blade having a cutting edge defined thereon and being mounted on the wheel for rotation therewith in a manner wherein the cutting edge of the second shear blade is adapted for operational positioning in closely spaced, parallel relationship with the cutting edge of the first shear blade upon rotation of the wheel, the improvement comprising;

a mounting bracket assembly interposed between the second shear blade and the wheel for mounting the second shear blade thereto, said mounting bracket assembly having a first slot defined in a first surface thereof, a second slot defined in a second surface thereof and a third slot defined in a third surface thereof;

a first mounting bolt positioned in the first slot to secure the mounting bracket to the wheel and having a preselected diameter; and a pair of second mounting bolts being positioned to engage the terminal end portions of the respective second and third slots slots and having a diameter that is less than that of the first bolt, said second mounting bolts being positioned within the respective second and third slots to directly bear any forces applied to the cutting edge of the second shear blade in a direction either parallel to either the first or second centerline or a summation of forces that occur in a direction therebetween either one or both of said bolts being adapted to shear upon the application of a force that is greater than that of a preselected magnitude against the second cutting edge.

3. The cutting apparatus as set forth in claim 2 wherein the mounting bracket assembly includes a base plate fixedly attached to a side wall of the wheel.

4. The cutting apparatus as set forth in claim 3 wherein the second shear blade is securable to a mounting plate, said mounting plate further defining said first, second and third slots.

5. The cutting apparatus as set forth in claim 2 wherein the first slot opens onto the first surface of the mounting bracket and terminates at an end portion that is spaced from the first surface.

6. The cutting apparatus as set forth in claim 5 wherein the second and third slots open onto respective second and third surfaces defined by the mounting bracket, said slots each terminating at an end portion that is spaced from the respective surface on which they open onto.

7. The cutting apparatus as set forth in claim 6 wherein the first mounting bolt is positioned within the first slot at a location that is intermediate the first surface of the mounting plate and the terminal end portion of the first slot to permit said mounting plate to move with respect to the mounting bolt in response to the shearing of either one or both of the second or third mounting bolts thereby allowing displacement of the second cutting edge with respect to the first while maintaining the attachment of the second shear blade to the wheel.

8. The cutting apparatus as set forth in claim 6 wherein the first mounting bolt is positioned on a first centerline that extends through a plane established by the second shear blade and the second mounting bolts are aligned along a second centerline that is generally perpendicular to the first centerline and is positioned on a half of the mounting plate that is nearest the cutting edge.

9. A cutting apparatus adapted for use between and axle assembly and a wheel that is mounted on the axle for rotation with respect thereto, comprising:

a first shear member having a cutting edge positioned at an orientation that is substantially parallel to the axle assembly and being fixedly attached to the axle member;

a second shear member having a cutting edge positioned at an orientation that is substantially parallel to the axle assembly and being mounted mounted to an inner surface of the wheel, said shear members being positionable in a manner wherein the respective cutting edges are in closely spaced opposition with respect to one another during rotation of said wheel, wherein the second shear member includes a mounting plate having a first slot defined thereon to open onto a first surface thereof, a second slot defined thereon to open onto a second surface thereof and a third slot defined thereon to open onto a third surface thereof, wherein the first slot terminates in an end portion that is spaced from the first surface of the mounting plate and is positioned along a first centerline that extends along a plane defined by the second shear member, wherein the second and third slots are positioned along a second centerline that is substantially perpendicular to the first centerline, said second and third slots terminating at respective end portions that are spaced from the respective second and third surfaces of the mounting plate;

a first mounting bolt being positioned within the first slot at a location that spaced between the terminal end portion of the slot and the first surface and having a first preselected diameter; and second and third mounting bolts being positioned within the respective second and third slots and having a diameter that is slightly smaller than that of the first mounting bolt, wherein the second and third mounting bolts are positioned within the respective second and third slots such that a portion thereof is in contact with at least one wall defined by the respective slots, said second and third bolts being adapted to shear upon application of a force against the cutting edge that is greater than a preselected magnitude and is directed along a line that is perpendicular to the second centerline in a direction that is toward the first mounting bolt.

\* \* \* \* \*

UNITED STATES PATENT AND TRADEMARK OFFICE
CERTIFICATE OF CORRECTION

PATENT NO. : 6,045,201
DATED : April 4, 2000
INVENTOR(S) : Chappell et al.

It is certified that error appears in the above-identified patent and that said Letters Patent is hereby corrected as shown below:

Please correct claim 1 as follows:

Column 4, line 15, delete "alone" and insert --along--

Signed and Sealed this

Twenty-fourth Day of April, 2001

*Attest:*

NICHOLAS P. GODICI

*Attesting Officer*    *Acting Director of the United States Patent and Trademark Office*